United States Patent [19]

Kunz

[11] Patent Number: 4,875,534
[45] Date of Patent: Oct. 24, 1989

[54] WEIGHING APPARATUS WITH IMPROVED ELECTROMAGNETIC LOAD COMPENSATION

[75] Inventor: Peter Kunz, Gossau, Switzerland

[73] Assignee: Mettler Instruments AG, Greifensee, Switzerland

[21] Appl. No.: 354,017

[22] Filed: May 19, 1989

[30] Foreign Application Priority Data

Jun. 14, 1988 [CH] Switzerland ......................... 2273/88

[51] Int. Cl.$^4$ ............................................. G01G 7/00
[52] U.S. Cl. .................................................... 177/212
[58] Field of Search ......................................... 177/212

[56] References Cited

U.S. PATENT DOCUMENTS

| | | | |
|---|---|---|---|
| 4,722,409 | 2/1988 | Kunz ..................... | 177/212 |
| 4,802,541 | 2/1989 | Bator et al. ........... | 177/212 |
| 4,825,968 | 5/1989 | Maaz et al. ............ | 177/212 |

Primary Examiner—George H. Miller, Jr.
Attorney, Agent, or Firm—Laubscher, Presta & Laubscher

[57] ABSTRACT

Weighing apparatus of the load compensation type includes a source of constant current pulses the duration of which is determined by a regulating signal in response to the position of the load receiver relative to the frame, thereby to maintain the load receiver in an initial or zero position during the application thereto of a load to be measured. The regulating circuit includes a PID regulating amplifier that produces a differential signal (D) and a proportional and integral signal (PI). The PI signal controls the operation of a switch that determines the duration of the constant current pulses, and the D signal modulates the amplitude of the constant current from which the pulses are formed. In this manner of using the differential regulating signal component (D), the influence of various deleterious effects on the weighing apparatus, such as vibration, is avoided.

5 Claims, 1 Drawing Sheet

WEIGHING APPARATUS WITH IMPROVED ELECTROMAGNETIC LOAD COMPENSATION

BRIEF DESCRIPTION OF THE PRIOR ART

This invention relates to an improved weighing apparatus of the electromagnetic load compensation type in which the magnitude of the compensation current supplied to the load compensation coil to maintain the load receiver in an initial zero position is a function of the load being measured.

Weighing systems of the aforementioned electromagnetic load compensation type are well known in the prior art, as evidenced, for example, by the prior patents to Baumgartner U.S. Pat. No. 3,677,357, Strobel U.S. Pat. No. 3,688,854, Baumgartner et al U.S. Pat. No. 4,039,036, Kunz U.S. Pat. No. 4,062,417 and Kaufmann U.S. Pat. No. 4,099,587. Furthermore, it is known to utilize in such weighing apparatus a so-called PID controller, where P, I and D represent the proportional, integral and differential components, respectively, of a position control signal. Examples of such PID controller systems are presented in the patents to Baumann et al U.S. Pat. No. 3,872,936, Strobel et al U.S. Pat. No. 4,189,017, and Kunz U.S. Pat. Nos. 4,245,711 and 4,627,505.

In the Allenspach U.S. Pat. No. 3,786,884 an electromagnetic load compensation type weighing apparatus is disclosed in which a constant current source is periodically connected with the compensation coil to supply direct current pulses thereto, use being made of a periodically operable switch for interrupting the constant current supply to define the current pulses. The conductive periods of the switch, and consequently the length of the current pulses, are determined from a position signal produced by a position detector that is mounted on the scale frame adjacent the load receiving member, the switch being controlled to produce sufficient compensation current for maintaining the load receiving member in its initial zero position. The magnitude of the compensation current thereby affords an indication of the magnitude of the load that is applied to the load receiver. The switch control means includes a regulating amplifier containing integration and differentiation circuits, and a comparison circuit compares the regulating amplifier output with a sawtooth voltage produced by a sawtooth voltage generator, the output from the comparison circuit operating a gate which in turn controls the operation of the periodic switch. Furthermore, this gate controls the supply of clock pulses to a counter so that the total number of pulses supplied to the counter is a function of the applied load, as indicated by a digital indicator. Such weighing apparatus of the electromagnetic load compensation type having a PID regulator affords high settlement speeds, but in the event of inaccurate regulation adjustment, the instrument tends to oscillate about the zero position. This diminishes the advantageous effect of the PID regulator with regard to settlement speed. Because of the aforementioned oscillating movement, the scale only gradually comes to a standstill, thereby delaying the reading of the load indication and/or further processing of the measurement result. This aforementioned disadvantage is particularly pronounced in weighing apparatus having a high sensitivity, and, owing to the deleterious effect of vibrations on the scale, for example, vibrations of the structure in which the apparatus is contained, often results in a situation where the load indicator does not come to a standstill at all during the presence of the adversely influencing factors. Of course, it is possible to produce an aperiodic curve of the transient oscillation process by appropriate adjustment of the PID regulator, in other words, to avoid oscillations of the regulation deviation. However, the transient oscillation behavior of series produced regulating circuits is subjected to a certain scatter in the event that there is no adjustment of each individual PID regulator. In practice, this results in a dominating influence of the differential regulating component and thus in a periodic transient oscillation behavior.

Measurement value variations of this sort can, of course, be reduced with the use of filters, but in most cases they cannot be eliminated completely. The use of filters for interference signal suppression, however, produces the disadvantage that the regulating speed of the regulating circuit is also reduced in an undesirable manner. All available measures which are designed to produce a mean value from the oscillating measurement value signal, however, result not only in a delay in the formation of the measurement value, but also presuppose that the interference signals, whose amplitudes under certain circumstances can attain the level of the measurement value signal in the case of nominal load, will operate distortion free along the entire transmission path both in the mechanical and in the electrical portions of the apparatus, thereby to prevent an adulteration of the measurement value signal. Such conditions, however, can be achieved only when the measurement and analyzing electronics of the scale are designed for a multiple of the nominal load (in other words, corresponding with the possible magnitude of the differential component D of the regulator signal), something that is quite expensive to achieve.

The present invention was developed to provide a weighing apparatus of the electromagnetic load compensation type in which interference oscillations are isolated from the load measuring and indicating means, in other words, especially from the aforementioned comparison circuit and the counting and indicator means, and more specifically, without any loss of regulating speed and without undue enlargement of the measurement electronics and/or the analyzing electronics of the weighing apparatus.

From German Pat. No. 2,150,479, it is known to provide a weighing apparatus of the electromagnetic load compensation type wherein the load compensation is achieved by a compensation current in the form of a direct current with load-dependent amplitude. This weighing apparatus operates with a PD regulator in which the proportional regulation signal component P controls a first current source for the generation of the load dependent compensation current, while the differential regulator signal component D controls a second current source which generates an alternating current that depends on the measurement value fluctuations. Both currents are supplied to the electromagnetic compensation means, but only the compensation current carrying the measurement value reaches the load analyzing and indicating means. Consequently, the measurement value reading comes to a quicker standstill, but the disadvantage of this solution resides in the fact that a second current source is required in the form of a voltage controlled constant current generator.

The present invention likewise uses the concept of separating the regulation signal into its components, but it avoids the disadvantage of having a second current source in that, according to the present invention, only the proportional and integral regulating signal components influence the pulse duration of the DC pulses, whereas the differential regulating signal component on the other hand produces an amplitude modulation of the direct current pulses.

SUMMARY OF THE INVENTION

Accordingly, in accordance with the primary object of the present invention, the regulating apparatus of the load compensation weighing apparatus provides two regulating signal outputs a first one of which represents the proportional and integral regulating components PI of the regulating voltage, while the second regulating signal corresponds with the differential component D of the regulating voltage. The first regulating signal PI is connected with the comparison means that controls the operation of the switching device, and consequently the length of the current pulses, while the second or differential output D from the regulator controls or amplitude modulates the current from the constant current source.

Thus, the mean value of the direct current compensation current—which is a function of pulse duration of the DC pulses, which in turn is a function of the magnitude of the load—remains independent of the amplitude modulation, since no additional DC component which would otherwise adulterate the measurement value is introduced in the compensation current. This results, on the one hand, from the fact that the differential regulating component D supplied to the amplitude modulator means does not contain any direct current voltage component, and on the other hand, the pulse frequency of the DC pulses is essentially higher than the frequency of the modulation of the interference signals normally expected during operation.

In accordance with a more specific object of the invention, the constant current compensation current supply means includes a constant current source that is supplied with a constant reference voltage from a constant voltage source, characterized in that the constant current source is amplitude modulated by the differential component signal D that is produced from the position signal by the regulating amplifier means. Thus, the constant control voltage $U_{REF}$ is superposed by the differential regulating signal component D. In this way, the present invention solves the problem of vibration compensation without significant expenditure. To this end, the constant current source includes a field effect transistor having a pair of power circuit electrodes and a control electrode, a first operational amplifier having an output connected with the control electrode of the field effect transistor, a non-inverting input to which the reference voltage $U_{REF}$ is applied, and an inverting input to which the differential component signal D is applied. The power circuit electrodes of the field effect transistor are connected in series with the periodically operated switch between the constant voltage source and the coil of the electromagnetic load compensation means.

In accordance with another more specific object of the invention, the regulating amplifier means includes second and third operational amplifier means, the second operational amplifier having a non-inverting input to which the position signal is applied. The output from the second operational amplifier is supplied to the inverting input of the third operational amplifier via a connecting resistor, a resistance and capacitance bridge being connected across the output and inverting input terminals of the third operational amplifier. Consequently, at the output of the second operational amplifier, the PI proportional and integral signal is supplied to one input of the comparison circuit for comparison with a sawtooth voltage produced by the sawtooth generator. The output from the second operational amplifier is also connected with one end of a resistance and capacitance circuit the other end of which supplies the differential component signal D.

BRIEF DESCRIPTION OF THE DRAWINGS

Other objects and advantages of the invention will become apparent from a study of the following specification, when viewed in the light of the accompanying drawing, in which.

DETAILED DESCRIPTION

In the following description, the disclosure of the aforementioned Allenspach U.S. Pat. No. 3,786,884 is incorporated by reference.

Figure 1:
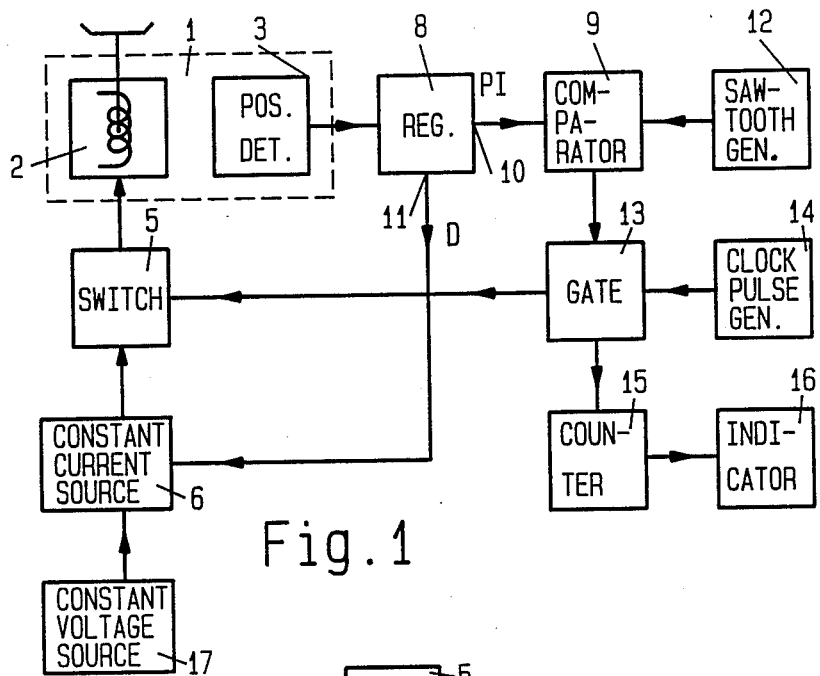
FIG. 1 is a block diagram of the electrical system of the weighing apparatus of the present invention.

Referring first more particularly to FIG. 1, the weighing apparatus 1 of the present invention is of the electromagnetic load compensation type including electromagnetic compensating means 2 having a coil connected with the load receiving means and arranged in a stationary magnetic field produced by permanent magnet means (not shown) secured with the scale frame. A position detector 3 is mounted on the scale frame adjacent the load receiver for detecting movement thereof relative to a zero or no-load position. A constant current source 6 is connected with the compensating coil 2 via a periodically operable switch 5, the constant current source 6 being supplied with a constant voltage produced by source 17. As is customary in the art as shown by the aforementioned U.S. Pat. No. 3,786,884, for example, the conducting and non-conducting cycle of switch 5 controls the length of current pulses—and consequently, the mean value of the DC compensation current—supplied to the compensation coil means 2, the periodic operation of the switch 5 being controlled by gate means 13. A position signal is supplied from the detector 3 to the input of the regulating amplifier means 8, which regulating amplifier according to the present invention operates to produce at one output terminal 10 the signal corresponding to the PI components, and at the second output 11 a second signal D corresponding to the differential component of the regulating signal. Also connected with the gate 13 is a clock pulse generator 14 which, when the gate 13 is open, supplies clock pulses to counter 15, the count of said counter being a function of load as presented on indicator means 16. Thus, the periodic opening of the gate 13 causes current pulses to be supplied to the compensation coil 2 of a duration that corresponds with the magnitude of the load applied to the load receiver means, and the number of clock pulses transmitted through the open gate to the counter 15 is also a function of load, as indicated by the indicator means 16.

Figure 2:
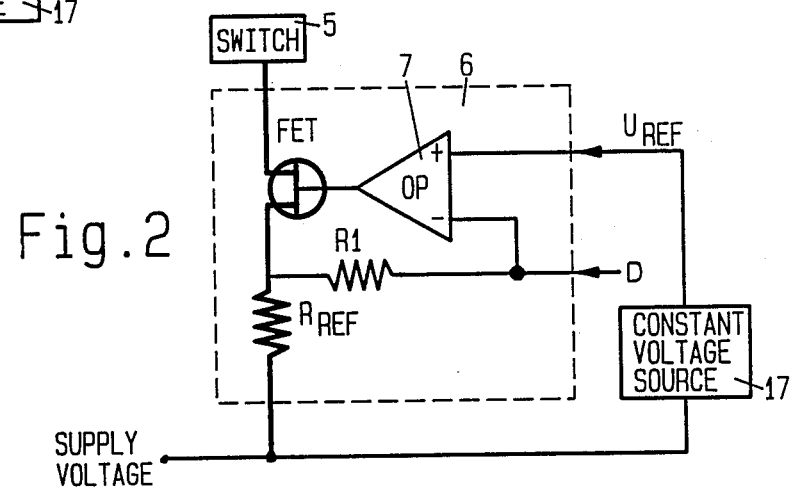
FIG. 2 is a detailed circuit diagram of the constant current source of FIG. 1.

Referring now to FIG. 2, the constant current source (i.e., a voltage to current converter) 6 includes a field effect transistor FET having a pair of power circuit electrodes and a control electrode, the control electrode being connected with the output of a first operational amplifier 7. The constant voltage source 17 is connected to the non-inverting input of operational amplifier 7, and one of the power circuit electrodes of the field effect transistor FET is connected with a reference resistor $R_{REF}$ and to resistor $R_1$, so the voltage across the resistor $R_{REF}$ is supplied through $R_1$ to the non-inverting input of the operational amplifier 7. The other power electrode of the FET is connected with switch 5. In accordance with the present invention, the differentiating signal D from the second output 11 of the regulating amplifier 8 is supplied to the inverting input of the operational amplifier 7, which inverting input is also connected with the junction between the reference resistor $R_{REF}$ and the field effect transistor FET via a biasing resistor $R_1$.

Figure 3:
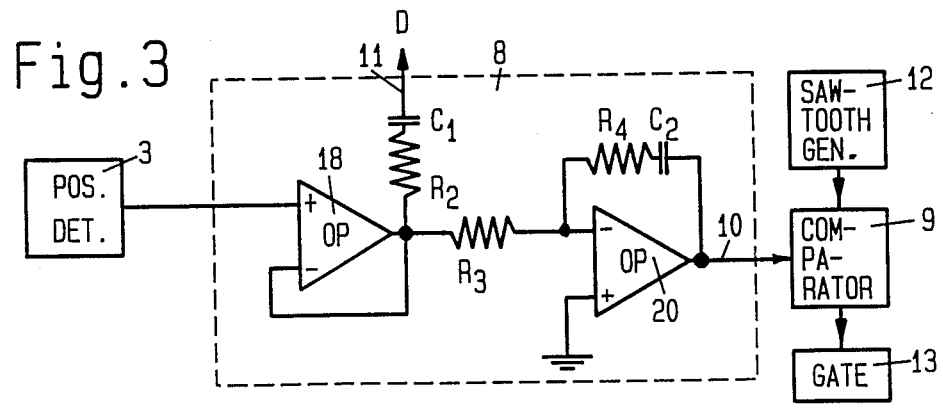
FIG. 3 is a detailed circuit diagram of the regulating amplifier means of FIG. 1.

Referring now to FIG. 3, the regulating amplifier 8 includes a pair of operational amplifiers 18 and 20, the position signal from detector 3 being applied to the non-inverting input of the operational amplifier 18. The inverting input to operational amplifier 18 is bridged to the output thereof, which output is connected with the inverting input of the third operating amplifier 20 via connecting resistor $R_3$. The non-inverting input of the third operational amplifier 20 is connected with ground, and the output terminal from this third operating amplifier is connected with the non-inverting input via a RC circuit including resistor $R_4$ and capacitor $C_2$, whereby at the first output terminal 10 of the regulating amplifier, a signal PI is produced corresponding with the proportional and integral components of the regulating signal, which PI signal is supplied to one input of the comparator circuit 9. Connected at one end with the output of the second operational amplifier 18 is an RC circuit including a resistor $R_2$ and capacitor $C_1$, the other end of said resistor circuit being connected with a second output terminal 11 that provides the differential signal D that is supplied to the operational amplifier as shown in FIG. 2. This differential signal D produces amplitude modulation of the constant current source 6, thereby compensating for deleterious effects produced, for example, by the vibrations imparted to the weighing apparatus 1. In FIG. 2, the differential regulating signal D is applied to the inverting input of the operational amplifier 16, and is superposed on top of the constant reference volta $U_{REF}$.

In this manner, it is assured that the pulse duration of the DC pulses supplied to the electromagnetic compensation means 2 are influenced only by the proportional and integral components PI of the regulating signal, and not by the regulating signal component D which is formed by the possible vibration movements of the scale, which regulating signal D performs its regulating function solely as pure amplitude modulation of the DC pulses, having no influence on the measurement signal at all.

While in accordance with the provisions of the Patent Statutes the preferred form and embodiment of the invention has been illustrated and described, it will be apparent to those skilled in the art that other changes may be made in the apparatus without deviating from the inventive concept set forth above.

What is claimed is:

1. Weighing apparatus of the electromagnetic load compensation type, comprising:
   (a) load receiving means connected for movement relative to a fixed support;
   (b) electromagnetic means (2) including means establishing a stationary magnetic field relative to said fixed support, and a coil arranged in said field and connected with said load receiving means;
   (c) means operable in response to the application of a load to be measured to said load receiving means for supplying compensation current to said coil to virtually maintain said load receiving means in an initial position relative to said support, said current supplying means including:
      (1) position detector means (3) for generating a position signal responsive to the position of said load receiving means relative to said support;
      (2) regulating means (8) responsive to said position signal for generating a regulating signal including proportional (P), integral (I) and differential (D) components;
      (3) means (6) supplying constant direct current;
      (4) switch means (5) connecting said constant current supply means with said electromagnetic means; and
      (5) means responsive to the proportional (P) and integral (I) components of said regulating signal for periodically operating said switch means between conducting and non-conducting conditions to supply current to said electromagnetic means;
   (d) means (6) responsive to the differential component (D) of said regulating signal for controlling said constant current means to modulate the amplitude of the constant current; and
   (e) indicator means (16) for indicating the magnitude of the applied load as a function of the compensation current supplied to said electromagnetic means.

2. Apparatus as defined in claim 1, wherein said switch operating means includes:
   (a) regulating amplifier means (8) having first (10) and second (11) outputs for supplying a first output signal (PI) corresponding with the proportional and integral components of said regulating signal, and a second output signal (D) corresponding with the differential component of said regulating signal;
   (b) a clock pulse generator (14);
   (c) a counter (15) associated with said indicating means;
   (d) gate means (13) operable to control the operation of said switch means and to supply pulses from said clock pulse generator to said counter;
   (e) a sawtooth generator (12); and
   (f) comparison circuit means (9) for operating said gate means as a function of the amplitude comparison of said first output signal (PI) with the sawtooth signal produced by said sawtooth generator.

3. Apparatus as defined in claim 2, wherein said constant current supply means includes:
   (a) a constant voltage source (17) for supplying a constant reference voltage ($U_{REF}$); and
   (b) means for superimposing said second signal (11) on said constant reference voltage.

4. Apparatus as defined in claim 3, wherein said superimposing means comprises:
   (1) a reference resistor ($R_{REF}$);
   (2) a field effect transistor (FET) having a pair of power circuit electrodes connecting said reference resistor in series between said switch and said constant voltage source, said field effect transistor including also a control electrode;

(3) a first operational amplifier (7) connected as a voltage follower and including an output terminal connected with said field effect transistor control electrode, a non-inverting input (+) connected with said reference voltage source, and an inverting input (−) connected with the second output (11) of said regulating amplifier (8) for receiving said differential component signal (D); and (4) a first resistor ($R_1$) connecting said inverting input with the junction between said reference resistor ($R_{REF}$) and said field-effect transistor (FET).

5. Apparatus as defined in claim 2, wherein said regulating amplifier means (8) includes:

(a) second (18) and third (20) operational amplifier means each including a non-inverting input (+), an inverting input (−), and an output, the non-inverting input of said second operational amplifier being connected with said position detector, said inverting input and said output of said second operational amplifier means being connected together;

(b) a differential circuit including a first capacitor ($C_1$) connected with a second resistor ($R_2$) to define a series circuit connected at one end with the output of said second operational amplifier, the other end of said differential circuit defining said regulating amplifier second output (11) for supplying the differential component signal (D);

(c) means including a third resistor ($R_3$) connecting the output of said second operational amplifier with the inverting input of said third operational amplifier, the non-inverting input of said second operational amplifier being connected with ground; and (d) an integration circuit including a second capacitor ($C_2$) connected in series with a fourth resistor ($R_4$) across the output and the inverting input of said third operational amplifier, the output of said third operational amplifier constituting said regulating amplifier first output (10) for supplying said proportional and integral component signal (PI).

* * * * *